United States Patent
Choi

(10) Patent No.: US 9,465,102 B2
(45) Date of Patent: Oct. 11, 2016

(54) APPARATUS, METHOD, AND COMPUTER READABLE MEDIUM FOR CORRECTING AN INTERPOLATION COEFFICIENT FOR STEREO MATCHING

(71) Applicant: Hyundai Motor Company, Seoul (KR)

(72) Inventor: Jinha Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 12 days.

(21) Appl. No.: 14/569,724

(22) Filed: Dec. 14, 2014

(65) Prior Publication Data

US 2016/0063759 A1    Mar. 3, 2016

(30) Foreign Application Priority Data

Sep. 3, 2014 (KR) .................. 10-2014-0117087

(51) Int. Cl.
*G06T 7/00* (2006.01)
*G01S 11/00* (2006.01)

(52) U.S. Cl.
CPC ............... *G01S 11/00* (2013.01); *G06T 7/002* (2013.01); *G06T 2207/10012* (2013.01); *G06T 2207/30261* (2013.01)

(58) Field of Classification Search
None
See application file for complete search history.

(56) References Cited

U.S. PATENT DOCUMENTS 5,860,912 A * 1/1999 Chiba ................ A61B 1/00059
348/45
2004/0027451 A1* 2/2004 Baker .................. H04N 5/2259
348/46

2012/0206569 A1* 8/2012 Verdier ................ G06T 3/4007
348/43
2013/0088578 A1 4/2013 Umezawa et al.

FOREIGN PATENT DOCUMENTS

| JP | 2011-096216 A | 5/2011 |
|---|---|---|
| KR | 10-0446414 B1 | 8/2004 |
| KR | 10-2006-0063575 A | 6/2006 |
| KR | 10-0934904 B1 | 1/2010 |
| KR | 10-2014-0049361 A | 4/2014 |

OTHER PUBLICATIONS

Manap et al. "Depth Image Layers Separation (DILS) Algorithm of Image View Synthesis based on Stereo Vision." IEEE International Conference on Signal and Image Processing, Oct. 8, 2013, pp. 61-66.*

Sung, Junho et al., "A Quadtree-based Disparity Estimation for 3D Intermediate View Synthesis", Jrl of Broadcast Engineering, vol. 9, Issue 3, pp. 257-273 (2004).

* cited by examiner

*Primary Examiner* — Jon Chang
(74) *Attorney, Agent, or Firm* — Mintz Levin Cohn Ferris Glovsky and Popeo, P.C.; Peter F. Corless

(57) ABSTRACT

An apparatus for correcting an interpolation coefficient for stereo matching includes: an interpolation coefficient generator configured to generate an interpolation coefficient $\lambda$; a correction value calculator configured to calculate a parameter and a weight value based on a position of an object in an image; and an interpolation coefficient corrector configured to correct the generated interpolation coefficient by multiplying the calculated parameter and the calculated weight value by the generated interpolation coefficient.

10 Claims, 2 Drawing Sheets

APPARATUS, METHOD, AND COMPUTER READABLE MEDIUM FOR CORRECTING AN INTERPOLATION COEFFICIENT FOR STEREO MATCHING

CROSS-REFERENCE TO RELATED APPLICATION

This application claims the benefit of and priority to Korean Patent Application No. 10-2014-0117087, filed on Sep. 3, 2014 in the Korean Intellectual Property Office, the disclosure of which is incorporated herein in its entirety by reference.

BACKGROUND

1. Technical Field

The present disclosure relates to an apparatus for correcting an interpolation coefficient for stereo matching, and more particularly, to a technology for correcting an interpolation coefficient which determines the depth of a tree in a Quad-tree-based stereo matching algorithm.

2. Description of the Related Art

In general, a Quad-tree-based stereo matching algorithm calculates an interpolation coefficient (λ) through a matching detection cost function, and based on the interpolation coefficient, determines the depth (i.e., structure) of a tree. By determining the depth of a tree using the interpolation coefficient, which is calculated regardless of an object (e.g., obstacle) being positioned in an image, the accuracy of matching can be low. Also, when the Quad-tree-based stereo matching algorithm is applied to calculate the distance from an object using a stereo image, the accuracy of matching can be even lower. Therefore, a scheme capable of correcting an interpolation coefficient according to the position of an object in an image is needed.

SUMMARY

In order to solve the above-described problem in the related art, the present disclosure provides an apparatus for correcting an interpolation coefficient for stereo matching, capable of improving accuracy when calculating the distance from an object using a stereo image, by adaptively correcting an interpolation coefficient which determines the depth of a tree in a Quad-tree-based stereo matching algorithm, based on the position of the object in an image.

According to embodiments of the present disclosure, an apparatus for correcting an interpolation coefficient for stereo matching of the present disclosure includes: an interpolation coefficient generator configured to generate an interpolation coefficient λ; a correction value calculator configured to calculate a parameter and a weight value based on a position of an object in an image; and an interpolation coefficient corrector configured to correct the generated interpolation coefficient by multiplying the calculated parameter and the calculated weight value by the generated interpolation coefficient generated.

The correction value calculator may include a first parameter calculator configured to calculate a first parameter α using the following equation: $\alpha=2^d$, wherein d is a distance between a stereo camera and the object.

The correction value calculator may include a second parameter calculator configured to calculate a second parameter β, which is a distance to the object, based on a number of pixels to a vanishing point in the image and a distance corresponding to a pixel.

The correction value calculator may include a lane detector configured to assign a weight value γ, when the object is positioned in the same lane as its vehicle.

The correction value calculator may include an edge detector configured to assign a weight value δ, when an edge of the object is detected.

The correction value calculator may include: a first parameter calculator configured to calculate a first parameter α using the equation: $\alpha=2^d$, wherein d is a distance between a stereo camera and the object; a second parameter calculator configured to calculate a second parameter β, which is a distance to the object, based on a number of pixels to a vanishing point in the image and a distance corresponding to a pixel; a lane detector configured to assign a weight value γ, when the object is positioned in the same lane as its vehicle; and an edge detector configured to assign a weight value δ, when an edge of the object is detected.

The interpolation coefficient corrector corrects the interpolation coefficient λ using the following equation: $\lambda'=\lambda \times \alpha \times \beta \times \gamma \times \delta$, wherein λ' is the corrected interpolation coefficient.

Furthermore, according to embodiments of the present disclosure, a method for correcting an interpolation coefficient for stereo matching includes: generating an interpolation coefficient λ; calculating a parameter and a weight value based on a position of an object in an image; and correcting the generated interpolation coefficient by multiplying the calculated parameter and the calculated weight value by the generated interpolation coefficient.

The method may further include calculating a first parameter α using the following equation: $\alpha=2^d$, wherein d is a distance between a stereo camera and the object.

The method may further include calculating a second parameter β, which is a distance to the object, based on a number of pixels to a vanishing point in the image and a distance corresponding to a pixel.

The method may further include assigning a weight value γ, when the object is positioned in the same lane as its vehicle.

The method may further include assigning a weight value δ, when an edge of the object is detected.

The method may further include: calculating a first parameter α using the equation: $\alpha=2^d$, wherein d is a distance between a stereo camera and the object; calculating a second parameter β, which is a distance to the object, based on a number of pixels to a vanishing point in the image and a distance corresponding to a pixel; assigning a weight value γ, when the object is positioned in the same lane as its vehicle; and assigning a weight value δ, when an edge of the object is detected.

The method may further include correcting the interpolation coefficient λ using the following equation: $\lambda'=\lambda \times \alpha \times \beta \times \gamma \times \delta$, wherein λ' is the corrected interpolation coefficient.

Furthermore, according to embodiments of the present disclosure, a non-transitory computer readable medium containing program instructions for correcting an interpolation coefficient for stereo matching includes: program instructions that generate an interpolation coefficient λ; program instructions that calculate a parameter and a weight value based on a position of an object in an image; and program instructions that correct the generated interpolation coefficient by multiplying the calculated parameter and the calculated weight value by the generated interpolation coefficient.

Accordingly, the teachings of the present disclosure can improve accuracy when calculating the distance from an object using a stereo image, by adaptively correcting an interpolation coefficient which determines the depth of a tree in a Quad-tree-based stereo matching algorithm, based on the position of the object in an image.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EMBODIMENTS

Figure 1:
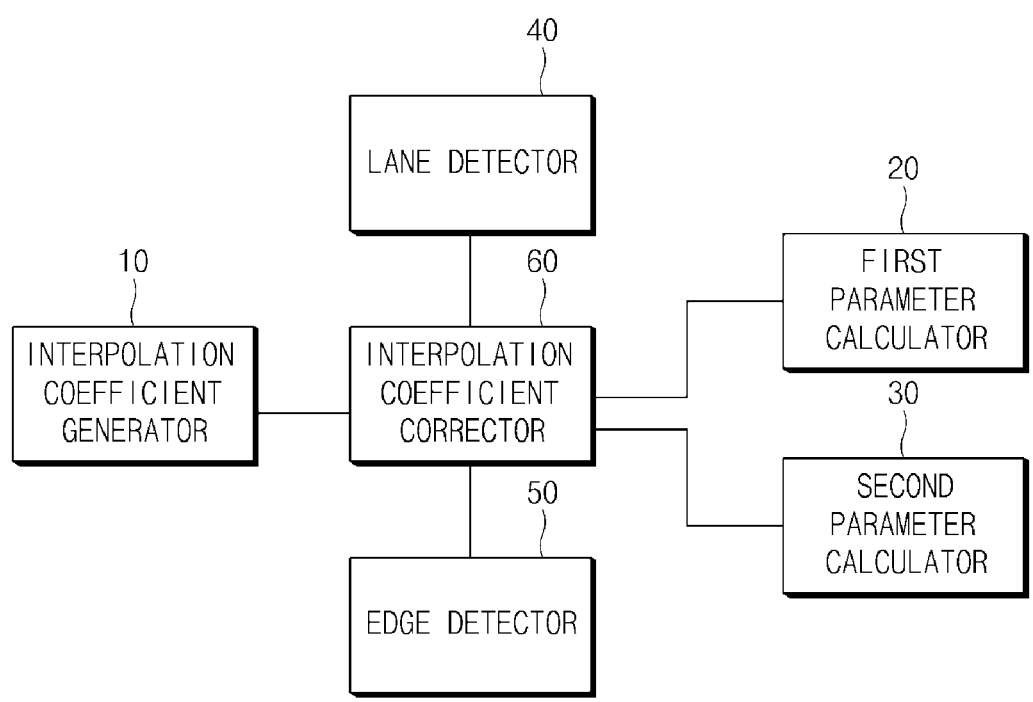
FIG. 1 is a configuration diagram of an apparatus for correcting an interpolation coefficient for stereo matching according to embodiments of the present disclosure.

The foregoing objects, features and advantages will be more apparent through the detail description as below with reference to the accompanying drawings, and thus, those skilled in the art can embody the technical spirit of the present disclosure. Hereinafter, with reference to the accompanying drawings, embodiments of the present invention will be described in detail. Other objects and advantages of the present disclosure can be understood by the following description, and they will become apparent through the disclosed embodiments. Also, it will be understood that the objects and advantages of the present disclosure can be realized by means described in the claims and combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for correcting an interpolation coefficient for stereo matching.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to FIG. 1 of the present disclosure, FIG. 1 is a configuration diagram of an apparatus for correcting an interpolation coefficient for stereo matching according to embodiments of the present disclosure.

As shown in FIG. 1, an apparatus for correcting an interpolation coefficient for stereo matching according to the present disclosure includes an interpolation coefficient generator 10, a first parameter calculator 20, a second parameter calculator 30, a lane detector 40, an edge detector 50, and an interpolation coefficient corrector 60. First, the interpolation coefficient generator 10 generates an interpolation coefficient ($\lambda$) which determines the depth of a tree in a Quad-tree-based stereo matching algorithm. Since the technology which the interpolation coefficient generator 10 generates the interpolation coefficient is well-known, the detailed process will be omitted.

Next, the first parameter calculator 20 calculates the distance d between a stereo camera and an object (e.g., an obstacle) based on a stereo vision system, and then calculates a first parameter $\alpha$ based on the following Equation:

$$\alpha = 2^d \quad \text{[Equation 1]}$$

Hereinafter, with reference to FIG. 2, the process which the first parameter calculator 20 calculates the distance d will be described.

First, the depth map is generated by finding a corresponding point using the image taken from the stereo camera 220. A moving object is detected using the depth map and the left/right image, and a disparity average in the detected moving object is obtained. In a stereo vision system, the distance of the object can be estimated by using the obtained disparity.

Figure 2:
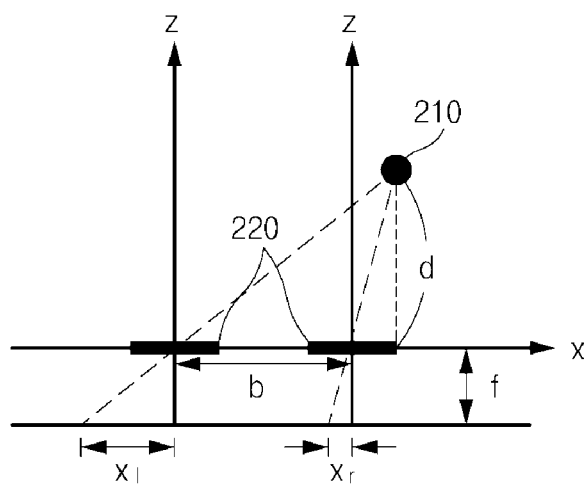
FIG. 2 is an exemplary diagram of a stereo image-based distance calculating process according to the present disclosure.

In FIG. 2, b (i.e., baseline) refers to the distance between the centers of the stereo cameras, f refers to the focal distance of stereo camera (e.g., the distance between a lens and an imaging device (for example, CCD, CMOS, etc.)), $x_l$ refers to the distance which the object focused on the left camera is deviated from the center of the left camera, $x_r$ refers to the distance which the object focused on the right camera is deviated from the center of the right camera, and d refers to the vertical distance between the object and the stereo camera. Accordingly, d may be represented as the following Equation:

$$d = \frac{f \times b}{x_l - x_r} \approx \frac{f \times b}{k \times p_d} \quad \text{[Equation 2]}$$

Here, $P_d$ refers to the distance between pixels of an image, and k refers to the number of pixels. That is, d can be calculated by dividing the product of the distance between the centers of the stereo cameras b and the focal length of the stereo camera f by the time difference $x_l-x_r$. The time difference $x_l-x_r$ may be approximated by the product of the distance between pixels of an image $P_d$ and the number of pixels k.

Next, the second parameter calculating section 30 calculates a distance β to the object based on the number of pixels to a vanishing point in an image and the distance corresponding to the pixels estimated through the lane estimation algorithm. For example, where the number of pixels to the vanishing point may be 100, and a single pixel may represent the actual 1 m (it can be known in the initial setting process). Thus, if the number of pixels from the lower end of the image to the object is 10, the distance from the stereo camera to the object is 10 m.

Next, the lane detector 40 assigns a first weight value (for example, γ>1) as a weight value γ if the object is positioned in the same lane with its vehicle, and assigns a second weight value (γ=1) if the object is not positioned in the same lane with its vehicle. Next, the edge detector 50 assigns a third weight value (for example, δ>1) as a weight value δ if the object is detected through the edge when detecting the object by the edge estimation algorithm, and assigns a forth weight value (δ=1) if the object is not detected through the edge. Here, the edge means the portion (i.e., pixel) which the change between areas is large.

Next, the interpolation coefficient corrector 60 corrects the interpolation coefficient generated by the interpolation coefficient generator 10 using at least one of the first parameter α calculated by the first parameter calculator 20, the second parameter β calculated by the second parameter calculator 30, the weight value γ assigned by the lane detector 40, and the weight value δ assigned by the edge detector 50. That is, the interpolation corrector 60 can correct the interpolation coefficient using the following Equation:

$$\lambda'=\lambda\times\alpha\times\beta\times\gamma\times\delta \quad \text{[Equation 3]}$$

Although all of α, β, γ, δ are applied in [Equation 3], only one of these parameters need be applied in the Equation (at least one parameter should be applied). Thus, there are 15 total possible formula configurations. Accordingly, the correction value calculator utilizes values derived from each of the first parameter calculator 20, the second parameter calculator 30, the lane detector 40, and the edge detector 50.

As the above described, although the present disclosure is explained by particular configurations and drawings, the technical concept of the invention is not limited to the aforementioned embodiments, and various modification and changes may be made within the equivalents of the technical concept of the present disclosure and the appended claims by those skilled in the art.

What is claimed is:

1. An apparatus for correcting an interpolation coefficient for stereo matching comprising:
   an interpolation coefficient generator configured to generate an interpolation coefficient λ;
   a correction value calculator configured to calculate a parameter and a weight value based on a position of an object in an image; and
   an interpolation coefficient corrector configured to correct the generated interpolation coefficient by multiplying the calculated parameter and the calculated weight value by the generated interpolation coefficient,
   wherein the correction value calculator includes:
      a lane detector configured to assign a weight value γ, when the object is positioned in a reference lane; and
      an edge detector configured to assign a weight value δ, when an edge of the object is detected.

2. The apparatus for correcting an interpolation coefficient for stereo matching according to claim 1, wherein the correction value calculator includes a first parameter calculator configured to calculate a first parameter α using the following equation:

$$\alpha=2^d,$$

wherein d is a distance between a stereo camera and the object.

3. The apparatus for correcting an interpolation coefficient for stereo matching according to claim 1, wherein the correction value calculator includes a second parameter calculator configured to calculate a second parameter β, which is a distance to the object, based on a number of pixels to a vanishing point in the image and a distance corresponding to a pixel.

4. The apparatus for correcting an interpolation coefficient for stereo matching according to claim 1, wherein the correction value calculator includes:
   a first parameter calculator configured to calculate a first parameter α using the equation:

$$\alpha=2^d,$$

wherein d is a distance between a stereo camera and the object; and
   a second parameter calculator configured to calculate a second parameter β, which is a distance to the object, based on a number of pixels to a vanishing point in the image and a distance corresponding to a pixel.

5. The apparatus for correcting an interpolation coefficient for stereo matching according to claim 4, wherein the interpolation coefficient corrector corrects the interpolation coefficient λ using the following equation:

$$\lambda'=\lambda\times\alpha\times\beta\times\gamma\times\delta,$$

wherein λ' is the corrected interpolation coefficient.

6. A method for correcting an interpolation coefficient for stereo matching comprising:
   generating an interpolation coefficient λ;
   calculating a parameter and a weight value based on a position of an object in an image; and
   correcting the generated interpolation coefficient by multiplying the calculated parameter and the calculated weight value by the generated interpolation coefficient,
   wherein the calculating of the weight value includes:
      assigning a weight value γ, when the object is positioned in a reference lane; and
      assigning a weight value δ, when an edge of the object is detected.

7. The method for correcting an interpolation coefficient for stereo matching according to claim 6, further comprising:
   calculating a first parameter α using the following equation:

$$\alpha=2^d,$$

wherein d is a distance between a stereo camera and the object.

8. The method for correcting an interpolation coefficient for stereo matching according to claim 6, further comprising:
   calculating a second parameter β, which is a distance to the object, based on a number of pixels to a vanishing point in the image and a distance corresponding to a pixel.

9. The method for correcting an interpolation coefficient for stereo matching according to claim 6, wherein the calculating of the parameter comprises:

calculating a first parameter α using the equation: $\alpha=2^d$, wherein d is a distance between a stereo camera and the object; and calculating a second parameter β, which is a distance to the object, based on a number of pixels to a vanishing point in the image and a distance corresponding to a pixel.

10. The method for correcting an interpolation coefficient for stereo matching according to claim 9, further comprising:

correcting the interpolation coefficient λ using the following equation:

$$\lambda'=\lambda \times \alpha \times \beta \times \gamma \times \delta,$$

wherein λ' is the corrected interpolation coefficient.

* * * * *